Feb. 26, 1935.  C. D. FATOR  1,992,929
ELECTRIC RUDDER CONTROL CONTACTING DEVICE
Original Filed Nov. 23, 1931
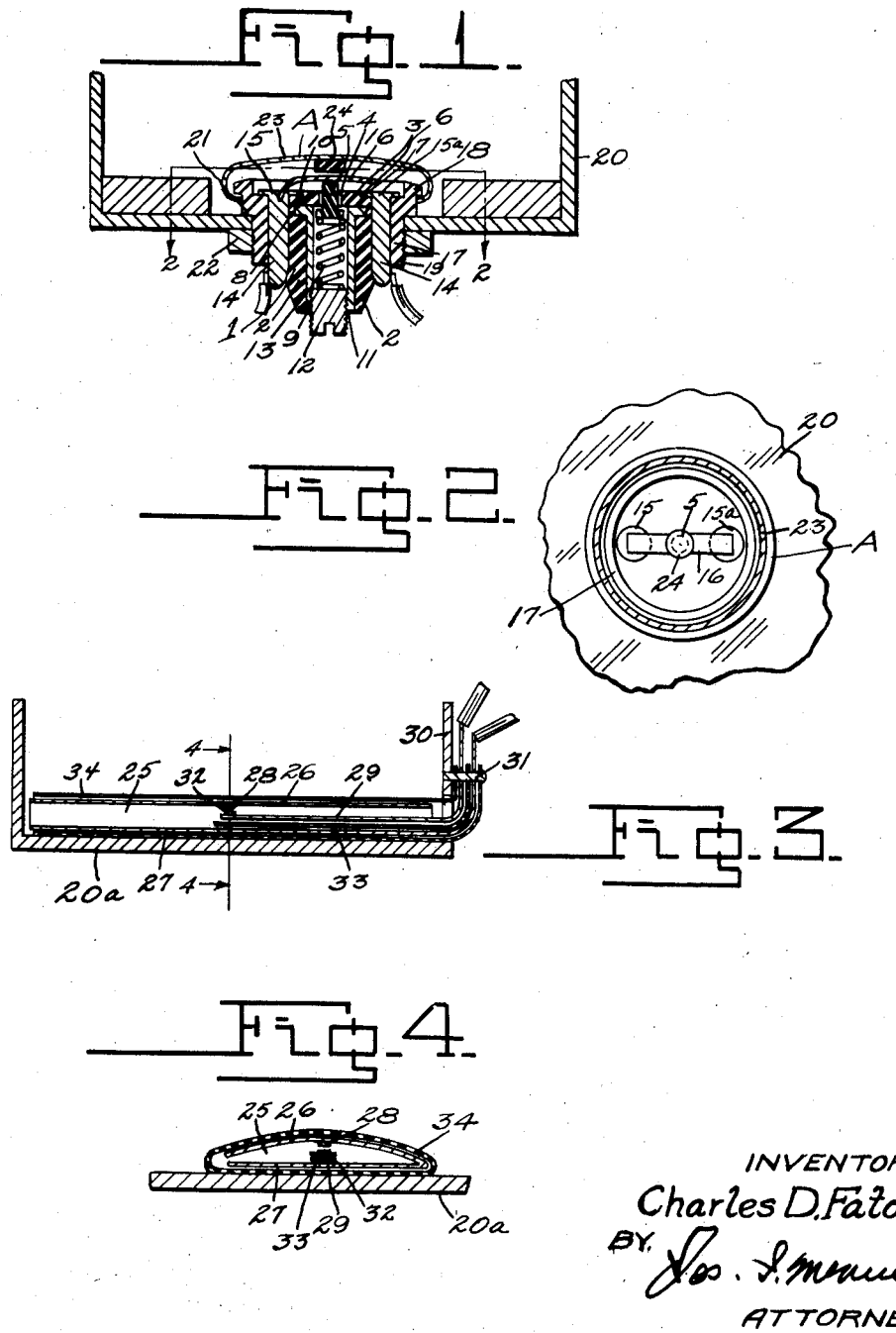
INVENTOR.
Charles D. Fator.
BY
ATTORNEY.

Patented Feb. 26, 1935

1,992,929

UNITED STATES PATENT OFFICE 1,992,929

ELECTRIC RUDDER CONTROL CONTACTING DEVICE

Charles D. Fator, United States Army, Wheeler Field, Territory of Hawaii

Original application November 23, 1931, Serial No. 577,761. Divided and this application January 5, 1933, Serial No. 650,308

3 Claims. (Cl. 200—159)

(Granted under the act of March 3, 1883, as amended April 30, 1928; 370 O. G. 757)

This invention described herein may be manufactured and used by or for the Government for governmental purposes, without the payment to me of any royalty thereon.

This invention relates to an improved electric rudder control contacting device, and more particularly it is directed to a device of this character for use on the foot controls of a vehicle for determining the intensity under which a driver operates the foot controls of the vehicle.

One of the objects of my invention is to provide an electric contacting device for use on the rudder controls of all manner of aircraft for closing an electrical circuit when a predetermined excessive pressure is applied by a student pilot to the rudder control pedals of the aircraft.

Another object of my invention is to provide an electric contacting device which is simple to operate, cheap to construct, which may be readily applied to the rudder control of an aircraft, and which is not liable to get out of order.

In the aviation service over-tenseness is a serious factor in the training of student pilots in operating the aircraft because in order that a student pilot of aircraft may become successful in the operation thereof he must learn to relax on the rudder controls, that is, to use his muscles naturally and avoid over-straining, and not lean too heavily on the rudder control pedals, which usually is the case of the beginner. This is usually quite difficult for the beginner, as he must be reminded quite often to relax. The sooner the student masters the art of relaxing the sooner he learns the "feel" of the controls necessary to learn to fly. Only excessive over-tenseness can be readily noticed by the instructor in the student, so when the student is only slightly tensed up he may plod along for sometime, gradually lagging behind the other student pilots on account of the handicap of his tenseness.

It is therefore the aim and purpose of my invention to provide an improved means in the form of an electric foot control contacting device for determining the intensity under which a student pilot operates the rudder controls of the aircraft, the electric foot control contacting device being mounted on the rudder controls of the aircraft and adapted to close an electrical circuit including an indicator (not shown) when a determined excessive pressure is applied by a student pilot to the rudder control pedals of the aircraft.

With the above and other objects and advantages in view, the invention specifically consists in features of construction, arrangement and operation of parts which will hereinafter appear. For purposes of illustration the invention will be described and claimed with reference to the accompanying drawing in which like numbers distinguish like parts and in which:

Fig. 1 is a vertical cross-sectional view of my improved rudder control contacting device and rudder control pedal to which the contacting device is applied;

Fig. 2 is a cross-sectional view of the rudder control pedal and my improved contacting device taken on line 2—2 of Fig. 1;

Fig. 3 is a vertical cross-sectional view of a modified form of my improved electric contacting device applied to a rudder control pedal, and Fig. 4 is a cross-sectional view thereof taken on line 4—4 of Fig. 3.

In the illustrated embodiment characterizing my invention, A indicates generally my improved rudder control contacting device which comprises a casing 1 made preferably of hard rubber having side walls 2 and an integral top portion 3 containing a centrally located opening 4 in which a plunger button 5 of insulating material is movably mounted. The top portion 3 of the casing 1 is also provided with a circumferential cut-out portion 6 providing a shoulder 7. A circumferential groove 8 is formed within the side walls 2 of the casing 1 adjacent the top portion 3 thereof. Embedded within the casing 1 is a metallic bushing 9 having a flared upper end 10 which is positioned within the internally formed groove 8 of the casing 1 and also having an internally threaded end 11 to which a plunger screw 12 having a screw driver slot is threadedly connected. A coil spring 13 is positioned within the bushing 9, the ends of which are adapted to abut against the plunger button 5 and screw 12. The plunger screw 12 is adapted to adjust the tension of the spring 13 and normally hold the plunger button 5 in an upward position and permit the same to be pushed inwardly against the tension of the spring 13 for operating the contacting device.

On each side of the casing 1 are electrical terminal plates 14 having flared upper ends 15 and 15a which abut against the shoulder 7 of the casing 1. These terminal plates 14 extend downwardly to a beveled end 11 of the casing 1. One end of a spring contacting arm 16 is embedded in the upper end 15 of one of the terminal plates 14. The end 15 of the terminal plate 14 is provided with a recess for allowing free movement of the spring arm at the bend thereof. Surrounding the contacting assembly is a bushing member 17 having a flared upper end 18 and an externally threaded contacting end 19 which is adapted to be inserted in an opening formed in the rudder control pedal 20, the shoulder 21 of the bushing 17 resting against the upper surface of the pedal 20 and held in place thereon by the lock nut 22. The lower end of the busing member 17 terminates just short of the lower end of the terminal plates 14 to which ends of electric conductors are connected. Mounted on the assembly is a domed shaped cap 23 made of suitable resilient material having the edges thereof bent under and inwardly to slidably lock under the flared upper end 18 of the bushing member 17. A piece of insulating material 24 is provided which may be suitably connected to the cap 23 as shown or to the spring contacting arm 16 for aiding the cap 23 in pressing the arm 16 inwardly against the plunger button 5 for causing the free end of the spring arm 16 to electrically contact with the upper end 15a of the other terminal plate 14. The spring 13 normally holding the plunger button 5 against the contact arm 16 to hold it in an inoperative position.

A modification of the rudder control electric contacting device is illustrated in Figs. 3 and 4 of the drawing. This modification has no spring adjustment as the tension of the spring is fixed. It comprises a metallic spring casing 25 which is bent upon itself to form upper and lower portions 26 and 27 respectively. The lower portion 27 forms the base of the device and is shaped to fit the contour of the face of the rudder control pedal 20a, the upper portion 26 thereof is shaped as shown in the drawing. The free ends of the casing 25 being separated from each other to provide a gap for permitting spring movement thereof. The casing 25 is of the proper weight to bend with a pressure slightly more than the normal weight of the leg and foot, the upper portion 26 thereof bending only when a predetermined excessive pressure is applied thereto by the foot. An electric contact point 28 is provided on the lower surface of the upper portion 26 intermediate the ends thereof. Longitudinally positioned within the spring casing 25 is a spring arm 29 having its outer end projecting out through a common opening formed in a side flange 30 of the pedal and attached to the outside of the control pedal 20a by means of a common bolt 31. On the inner end of arm 29 and on the upper surface thereof adjacent the contact point 28 is a contact point 32. The spring arm 29 is insulated from the lower portion 27 of the casing 25 by means of a parallel arm 33 made of any suitable insulating material. The outer end of arm 33 is also bent upwardly and connected to the bolt 31. To protect and insulate the contact mechanism the whole assembly is covered by a sleeve 34 made of any suitable insulating material which conforms to the shape of the spring casing 25 having its outer end bent upwardly to connect with the bolt 31. Connected to the outer end of the lower portion 27 of the casing 25 and the outer end of the spring arm 29 are electric conductors of an electrical system illustrated in my co-pending application No. 577,761, filed November 23, 1931, of which the present application is a division thereof.

It will be readily seen from the above description of the contacting device by any one skilled in the art, that when a predetermined excessive pressure is applied to the spring casing 25 by the foot of the student pilot that the upper portion 26 thereof will bend downwardly and cause the electric contact point 28 to come in contact with the electric contact point 32 provided in the spring arm 29, thereby closing an electrical circuit (which is illustrated in my co-pending application above referred to) between the spring arm 29 and the metallic spring casing 25.

It will thus be seen that this invention provides a highly novel, simple and efficient form of rudder control electric contacting device that is well adapted for all the purposes designated. Even though it is herein shown and described my invention as comprising certain features of construction, arrangement and operation, it is nevertheless to be understood that changes may be made therein without departing from the spirit or scope of my invention.

Now that I have disclosed my invention, what I claim as new and useful is:

1. A device of the character described, comprising a casing having spaced conductors therein with terminals attached thereto, spring conductor means connected to one of said conductors and resiliently held out of contact from the other conductor by means of a spring pressed button, means for adjusting the pressure of said spring pressed button, and resilient depressible means for forcing said spring conductor means into contacting engagement with said second conductor against the action of said button.

2. A device of the character described, comprising a casing having spaced conductors therein with terminals attached thereto, spring conductor means connected to one of said conductors and resiliently held out of contact with the other conductor by a button, a bushing embedded in said casing, a spring in said bushing for holding said button pressed against said spring conductor means, a plunger screw for adjusting the tensity of said spring and resilient depressible means for forcing said spring conductor means into contacting engagement with said second conductor against the action of said spring pressed button.

3. A device for indicating excessive foot pedal pressure comprising in combination a foot pedal formed with an opening and an annulus disposed upon the pedal and surrounding the opening; of a depressible cap situated within the opening of the annulus and having its upper surface located in a plane slightly above that of the annulus, a casing seated within the opening in the foot pedal and supporting the depressible cap, a pair of electrodes arranged and spaced in insulated relation within the casing and adapted to be included in the circuit of an electro-responsive recording apparatus, a resilient conducting member supported by one of the electrodes, the free end of said member being adapted to engage the remaining electrode, a spring pressed plunger co-acting with said conducting member to normally maintain its free end out of engagement with said remaining electrode, an adjustable tensioning means in connection with the spring of said plunger whereby pressure in excess of a predetermined limit will depress the resilient conducting member and close the circuit through said electro-responsive recording apparatus.

CHARLES D. FATOR.